United States Patent [19]

Nishimura

[11] 4,304,373
[45] Dec. 8, 1981

[54] WEBBING RETRACTOR

[75] Inventor: Yuji Nishimura, Aichi, Japan

[73] Assignees: Toyota Jidosha Kogyo Kabushiki Kaisha; Kabushiki-Kaisha Tokai-Rika-Denki-Seisakusho, both of Aichi, Japan

[21] Appl. No.: 134,781

[22] Filed: Mar. 28, 1980

[30] Foreign Application Priority Data

May 10, 1979 [JP] Japan .............................. 54-62729[U]

[51] Int. Cl.³ ...................... A62B 35/02; B65H 75/48
[52] U.S. Cl. .............................. 242/107.4 A; 280/806
[58] Field of Search ................ 242/107.4 R–107.4 E; 280/802–808; 297/474–480

[56] References Cited

U.S. PATENT DOCUMENTS 4,040,645  8/1977  Giffen et al. ..................... 280/803
4,181,326  1/1980  Hollowell ................. 242/107.4 A X Primary Examiner—John M. Jillions
Attorney, Agent, or Firm—Stevens, Davis, Miller & Mosher

[57] ABSTRACT

A lock mechanism adapted to be actuated by an acceleration sensor in an emergency of a vehicle prevents webbing windoff, whereby an occupant is restrained. After completion of a collision, the manual operation of a release lever releases the action of the lock mechanism, so that the occupant can unfasten the webbing from himself to escape from the vehicle to outside. Thereafter, when the webbing is wound up the release lever is restored, so that the lock mechanism can lock again, thereby enabling to secure the restraint of the occupant for a subsequent emergency.

9 Claims, 4 Drawing Figures

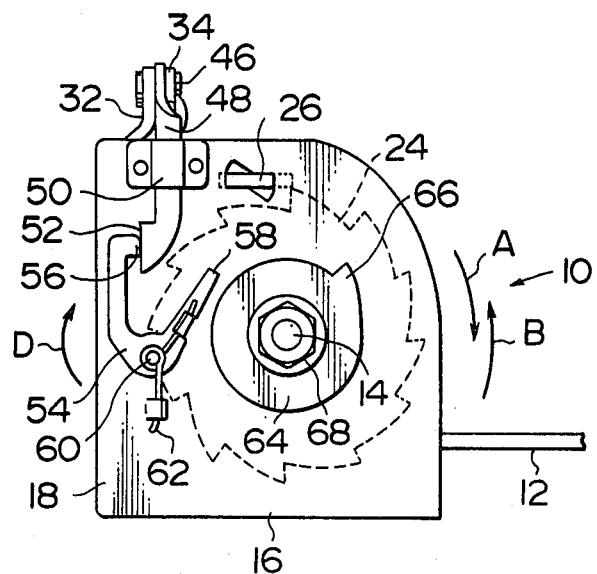
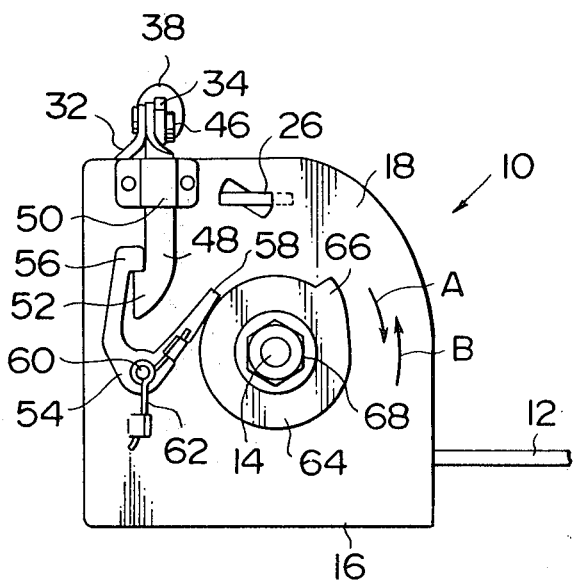

WEBBING RETRACTOR

BACKGROUND OF THE INVENTION

1. Field of the Invention

This invention relates to a webbing retractor for winding up a webbing for protecting an occupant in an emergency of a vehicle.

2. Description of the Prior Art

In general, a webbing retractor is provided therein with a lock mechanism capable of abruptly preventing webbing windoff rotation of a takeup shaft in an emergency of the vehicle, to thereby reliable restrain the occupant.

There have been such cases that, when the lock mechanism is used in the passive seatbelt system, wherein, in order to meet the action of the occupant entering or leaving the compartment, the webbing is automatically fastened to or unfastened from the occupant in accordance with the opening or closing action of the door, particularly, if the vehicle is tiltingly stopped at a slope or the like after a collision of the vehicle, unfastening of the webbing from the occupant and opening of the door become impossible. Consequently, there has been proposed an unlock mechanism for permitting the occupant to quickly escape from the compartment in an emergency of the vehicle (U.S. patent application Ser. No. 90,402 now U.S. Pat. No. 4,253,622). This unlock mechanism is constructed such that the occupant turns a release lever to unlock the lock mechanism, whereby the occupant makes it possible to wind off the webbing, so that the occupant can unfasten the webbing from himself to leave the vehicle to outside.

However, with this unlock mechanism, it is necessary to manually restore the release lever when the occupant enters the vehicle again, and, when it is failed to do this restoring operation, even if a dangerous situation takes place during running of the vehicle thereafter, the lock mechanism cannot prevent the webbing from being wound off, so that there will be possibilities of that the occupant cannot be secured in safety.

SUMMARY OF THE INVENTION

This invention has been developed to obviate the abovedescribed problems of the prior art, and has as its object the provision of a webbing retractor capable of automatically restoring the release lever after its unlocking action in a webbing retractor provided therein with an unlock mechanism.

The webbing retractor according to the present invention is constructed such that the turned position of the release lever of the unlock mechanism is retained by a retaining arm to form an unlocked condition to thereby allow the occupant to leave the vehicle to outside, and a release plate is provided for releasing the retention of the release lever by the retaining arm during webbing windup rotation of the takeup shaft so that the lock mechanism is made operable by restoring the release lever during webbing windup rotation of the takeup shaft which takes up after the occupant has left the vehicle to outside.

Description will hereunder be given of an embodiment of the present invention with reference to the drawings.

BRIEF DESCRIPTION OF THE DRAWINGS

FIG. 3 is a left-hand side view of FIG. 1;
and
FIG. 4 is a drawing of operating condition of FIG. 3.

DESCRIPTION OF THE PREFERRED EMBODIMENT

Figure 1:
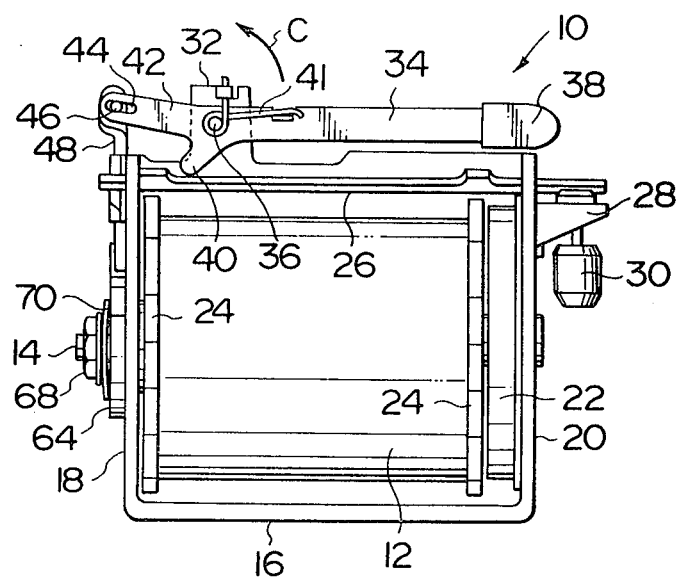
FIG. 1 is a front view showing an embodiment of the webbing retractor according to the present invention.
Figure 2:
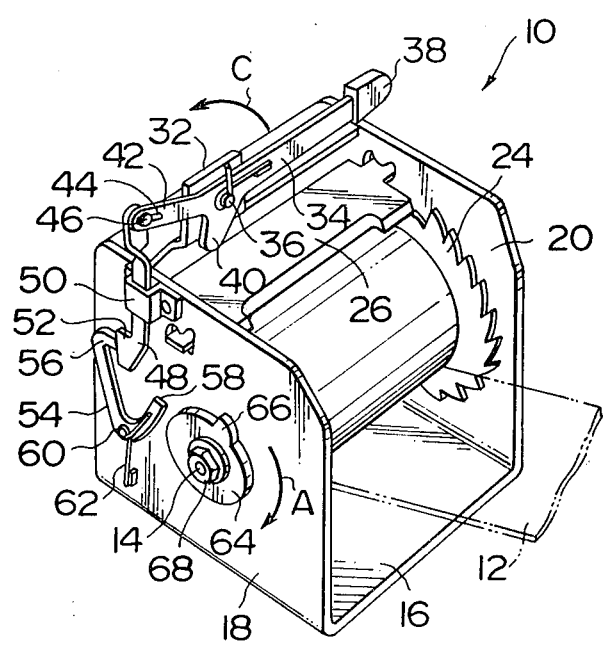
FIG. 2 is a perspective view of FIG. 1.

As shown in FIGS. 1 through 3, in a webbing retractor 10, a takeup shaft 14 for winding up a webbing 12 for restraining an occupant is extended through legs 18, 20 of a letter 'U' shaped base 16 and pivotally supported thereon. Furthermore, a spiral spring 22 is confined between the takeup shaft 14 and the leg 20, and the takeup shaft 14 is biased and rotated in the direction of winding up the webbing (a direction indicated by an arrow A in FIGS. 2 and 3) by a biasing force of the spiral spring to wind up the end portion of the webbing 12 in layers. Consequently, when the occupant winds off the webbing 12 against the biasing force of the spiral spring 22, it is possible to change the length of a fastened portion, not shown, of the webbing 12.

Solidly secured to the takeup shaft 14 and interposing the webbing 12 therebetween are a pair of ratchet wheels 24, which are in opposed relationship with a pawl 26 pivotally supported by butterfly wing-shaped holes formed in the legs 18, 20, respectively. One end of the pawl 26 is extended through the leg 20 and rested on a pendulum 30 suspended by a bracket 28 outside the leg 20. Here, the pawl 26 is maintained in substantially horizontal position during normal running condition of a vehicle. However, in case the vehicle is in an emergency such as a collison, the pawl 26 is tilted by the oscillation of the pendulum 30, meshed with the ratchet wheels 24, so that the wind off rotations of the ratchet wheels 24 and the takeup shaft 14 (in a direction indicated by an arrow B) can be prevented.

Here, the pendulum 30, pawl 26 and ratchet wheels 24 constitute a lock mechanism for locking the webbing in an emergency of the vehicle.

Solidly secured to the legs 18, 20 of the letter 'U' shaped base is a bracket 32, on which is pivotally supported a substantially intermediate portion of a release lever 34 through a pin 36. Secured to one end of the release lever 34 is a knob 38 for receiving manual operating force of the occupant, and the other end of the release lever 34 is formed into a working corner 40 being in opposed relationship with the pawl 26. When the release lever 34 is turned by the manual operating force of the occupant in the working direction (a direction indicated by an arrow C in FIG. 1), the working corner 40 engages a portion of the pawl 26 to restore the pawl 26, which has been tilted in the lock mechanism, to the substantially horizontal position, thereby enabling to separate the pawl 26 from the ratchet wheels 24. In addition, the release lever 34 is biased by a spring 41 in a direction opposite to the direction indicated by the arrow C.

Projected from the intermediate portion of the release lever 34 is a connecting portion 42, and a connecting arm 48 is pivotally supported through a pin 46 by a slot 44 formed at the forward end portion of the connecting portion 42. the intermediate portion of the connecting arm 48 is inserted into a letter 'U' shaped guide 50 solidly secured to the leg 18, and the connecting arm 48 can be moved in the vertical direction in FIG. 1 through the letter 'U' shaped guide 50 by the turning of the release lever 34.

Formed at the other end of the connecting arm 48 is an engageable latch member 52 being in opposed relationship with an engageable latch member 56 formed at one end of a retaining arm 54.

The retaining arm 54 is formed of a flat plate punched into a substantially letter 'V' shape, the other end thereof is formed into a contact portion 58, the intermediate portion thereof is pivotally supported through a pin 60 on the leg 18, and a torsional coil spring is confined between the retaining arm 54 and the leg 18, so that the engageable latch member 56 is biased in a direction of being engaged with the engageable latch member 52 of the connecting arm 48 (a direction indicated by an arrow D in FIG. 3). When the release lever 34 is turned, the retaining arm 54 is meshed with the engageable latch member 52 of the connecting arm 48 by the biasing force, and the contact portion 58 is adapted to approach the outer periphery of the release plate 64 as shown in FIG. 4.

The release plate 64 is of a disc-like flat plate shape with release projection 66 projecting from a portion of the outer periphery of the disc-like flat plate, pivotally supported by an end portion of the takeup shaft 14 projected through the leg 18, and prevented by a nut 68 from falling off the takeup shaft 14. The release projection 66 of the release plate 64 has one side radially directed, which is adapted to rotate in the counterclockwise direction in FIGS. 3 and 4 to be abutted against the contact portion 58 and prevented from rotating, and the other side inclined by a predetermined angle with respect to the one side, which is adapted to rotate in the clockwise direction to push up the contact portion 58. Furthermore, a spring washer 70 is confined between the release plate 64 and the takeup shaft 14, whereby the release plate 64 is brought into frictional contact with the takeup shaft 14, and, when a predetermined value of a relative turning force is acted on the release plate 64 in the direction of the takeup shaft 14, the release plate 64 can rotate relative to the takeup shaft 14 against a frictional force generated by the spring washer 70.

Description will hereunder be given of operation of the present embodiment with the abovedescribed arrangement. FIGS. 1 through 3 show the lock mechanism in an unactuated position, where the occupant can wind off a required length of the webbing 12 from the takeup shaft 14 to freely fasten it to himself. Furthermore, it is possible to wind off a required length of the webbing 12 during normal running condition of the vehicle, so that the driving posture can be changed.

In case the vehicle is in an emergency such as a collision, the pendulum 30 senses the acceleration of the vehicle to be oscillated, whereby the pawl 26 is tilted to mesh with the ratchet wheels 24, to thereby abruptly interrupt the windoff rotation (the direction indicated by the arrow B) of the takeup shaft 14. Consequently, the occupant can be positively restrained by the webbing 12, so that the safety of the occupant can be assured.

Next, in the case the occupant leaves the vehicle to outside after the collision of the vehicle, it is necessary to unfasten the webbing 12. However, since a tensile force given by the occupant is acting on the webbing 12, the takeup shaft 14 is being rotated in the direction of winding up the webbing, whereby the pawl 26 is maintained in a condition of being meshed with the ratchet wheels 24. Here, if the occupant turns the release lever 34 in a direction of unlocking (the direction indicated by the arrow C), the pawl 26 can receive a turning force of the release lever 34 to be turned, to thereby be separated from the ratchet wheels 24. Furthermore, by the turning of the release lever 34, the engageable latch member 52 of the connecting arm 48 meshes with the engageable latch member 56 as shown in FIG. 4, whereby the connecting arm 48 engages the retaining arm 54 to thereby retain the release lever 34 in a turning position. As a result, the pawl 26 is spaced apart from the ratchet wheels 24, whereby the occupant can wind off the webbing 12 from the takeup shaft 14, so that the webbing 12 can be unfastened from himself, thus enabling him to leave the vehicle to outside.

In addition, in this windoff condition of the webbing 12, the release plate 64 is also subjected to the turning force of the takeup shaft 14 through the spring washer 70, the release plate 64 is rotated in the direction of winding off the webbing. Then, when the release projection 66 comes into contact with the contact portion 58 of the retaining arm 54, the release plate 64 is prevented by the retaining arm 54 from rotating, whereby the release plate 64 slides on the takeup shaft 14 and rotates relative thereto.

Next, after the occupant has left the vehicle to outside, the takeup shaft 14 is rotated by the biasing force of the spiral spring 22 in the direction of winding up the webbing (the direction indicated by the arrow A), to thereby wind up the webbing 12. By the rotation of the takeup shaft 14, the release plate 64 is rotated together with the takeup shaft 14 again through the agency of the spring washer 70 in the direction of winding up the webbing. By this, the release projection 66 of the release plate 64 pushes up and turns the retaining arm 54, and the engageable latch member 56 of the retaining arm 54 is disengaged from the engageable latch member 52 of the connecting arm 48, and the release lever 34 is restored by the spring 41 from the turning position to the position as shown in FIG. 1.

Consequently, the working corner 40 of the release lever 34 is separated from the pawl 26 again, and, when the pendulum 30 senses the acceleration of the vehicle to be oscillated, the pawl 26 will be able to mesh with the ratchet wheels 24 again. With the abovedescribed arrangement, after the occupant has entered the vehicle again, the operation of the lock mechanism is assured, so that the safety of the occupant can be secured.

As has been described so far, the webbing retractor according to the present invention is provided therein with a retaining arm for retaining the operating condition of the release lever and a release plate for releasing the retention, and hence, such outstanding advantages can be offered that the occupant can readily leave the vehicle to outside in an emergency of the vehicle, and moreover, after the occupant has entered the vehicle again, the lock mechanism operates reliably, to thereby secure the safety of the occupant.

What is claimed is:

1. A webbing retractor for use in a seatbelt system for restraining and protecting an occupant in an emergency of a vehicle, comprising:
   (a) a takeup shaft for winding up a webbing for restraining the occupant;
   (b) a lock mechanism for preventing the webbing windoff rotation of said takeup shaft in an emergency of the vehicle so as to restrain the occupant with the webbing;

(c) a release lever for releasing the locking action of said lock mechanism in operation to allow the webbing to be wound off from the takeup shaft;

(d) a retaining arm for retaining an actuated position of said release lever to maintain an unlocked condition of the lock mechanism; and (e) a release plate for releasing the retention of the release lever by said retaining arm during webbing windup rotation of said takeup shaft to allow the release lever to be restrored;

whereby the webbing windoff by the occupant resumes the action of the lock mechanism during the fastening of the webbing to the occupant.

2. A webbing retractor as set forth in claim 1, wherein, said release plate is frictionally coupled to said takeup shaft, whereby said release plate can rotate relative to the takeup shaft at a predetermined value of resistance force.

3. A webbing retractor as set forth in claim 2, wherein said frictional coupling is resulted from a spring confined between the release plate and the takeup shaft.

4. A webbing retractor as set forth in claim 1, wherein said release plate is a cam plate coaxially supported on said takeup shaft.

5. A webbing retractor as set forth in claim 1, wherein said retaining arm is pivotally supported on a base supporting said takeup shaft.

6. A webbing retractor as set forth in claim 5, wherein an engageable latch member for retaining said release lever is formed at one end of said retaining arm, the other end of which is formed to provide a contact portion for the release plate.

7. A webbing retractor as set forth in claim 6, wherein a connecting arm is connected to said release lever, and an engageable latch member for engaging said engageable latch member of said release lever is formed at the forward end portion of said connecting arm.

8. A webbing retractor as set forth in claim 7, wherein said retaining arm is biased in a direction that said engageable latch member of said retaining arm comes into contact with the engageable latch member of the connecting arm.

9. A webbing retractor as set forth in claim 1, wherein said lock mechanism comprises ratchet wheels solidly secured to the takeup shaft, a pawl to be engaged with or disengaged from said ratchet wheels, and an acceleration sensor for engaging said pawl with the ratchet wheels in an emergency of the vehicle so as to prevent the webbing windoff rotations of the ratchet wheels and the takeup shaft.

* * * * *